(12) United States Patent
Chen et al.

(10) Patent No.: US 8,987,166 B2
(45) Date of Patent: Mar. 24, 2015

(54) PREPARATION OF CERIUM OXIDE-SUPPORTED NANO GOLD-SILVER CATALYSTS AND ITS APPLICATION IN CARBON MONOXIDE REMOVAL IN AIR

(71) Applicant: National Central University, Jhongli, Taoyuan County (TW)

(72) Inventors: Yu-Wen Chen, Jhongli (TW); Wen-Ching Cheng, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 58 days.

(21) Appl. No.: 13/738,753

(22) Filed: Jan. 10, 2013

(65) Prior Publication Data
US 2013/0183220 A1      Jul. 18, 2013

(30) Foreign Application Priority Data
Jan. 13, 2012  (TW) .............. 101101434 A

(51) Int. Cl.

| | |
|---|---|
| *B01J 21/00* | (2006.01) |
| *B01J 23/00* | (2006.01) |
| *B01J 25/00* | (2006.01) |
| *B01J 29/00* | (2006.01) |
| *B01J 31/00* | (2006.01) |
| *B01J 37/00* | (2006.01) |
| *C08F 4/02* | (2006.01) |
| *C08F 4/60* | (2006.01) |
| *B01J 21/10* | (2006.01) |
| *B01J 23/66* | (2006.01) |
| *B01D 53/00* | (2006.01) |
| *B01J 37/03* | (2006.01) |
| *B01J 37/06* | (2006.01) |
| *B01J 37/08* | (2006.01) |
| *B01J 23/52* | (2006.01) |
| *B01J 35/00* | (2006.01) |
| *B01D 53/86* | (2006.01) |
| *B01J 23/63* | (2006.01) |

(52) U.S. Cl.
CPC .................. *B01J 23/66* (2013.01); *B01D 53/00* (2013.01); *B01J 37/031* (2013.01); *B01J 37/06* (2013.01); *B01J 37/08* (2013.01); *B01J 23/52* (2013.01); *B01J 35/006* (2013.01); *B01D 53/864* (2013.01); *B01J 37/035* (2013.01); *B01J 23/63* (2013.01); *B01D 2255/104* (2013.01); *B01D 2255/106* (2013.01); *B01D 2255/2065* (2013.01); *B01D 2257/502* (2013.01)
USPC ........... 502/304; 502/100; 502/102; 502/300; 502/325

(58) Field of Classification Search
USPC ......................... 502/304, 100, 102, 300, 325
See application file for complete search history.

(56) References Cited

U.S. PATENT DOCUMENTS

| | | | |
|---|---|---|---|
| 5,258,340 A | | 11/1993 | Augustine et al. |
| 2010/0226846 A1 | * | 9/2010 | Sundar et al. ............. 423/437.2 |
| 2010/0248297 A1 | * | 9/2010 | Hwu et al. ...................... 435/34 |
| 2012/0255897 A1 | * | 10/2012 | Lu et al. ..................... 210/321.6 |
| 2013/0142720 A1 | * | 6/2013 | Chen et al. ................. 423/245.1 |

FOREIGN PATENT DOCUMENTS

TW       200613048       5/2006

OTHER PUBLICATIONS

A. Sandoval et al., Bimetallic Au—Ag/TiO2 catalyst by deposition-precipitation:high activity and stability in CO oxidation, Journal of Catalysis, 2011, pp. 40-49.
P. Naknam et al., Preferential catalytic oxidation of carbon monoxide in presence of hydrogen over bimetallic AuPt supported on zeolite catalysts, Journal of Power Sources, 2007, pp. 353-358.
G. Panzera et al., CO selective oxidation on ceria-supported Au catalysts for fuel cell application, Journal of Power Sources, 2004, pp. 177-183.
Y. Zhang et al., Macroporous Monolithic Pt/ y-Al2O3 and K—Pt/y-Al2O3 Catalysts Used for Preferential Oxidation of CO, Catal Lett, 2009, pp. 339-347.

* cited by examiner

*Primary Examiner* — James McDonough
(74) *Attorney, Agent, or Firm* — Muncy, Geissler, Olds & Lowe, P.C.

(57) ABSTRACT

The preparation of bimetallic gold-silver cerium dioxide-supported catalysts and the process of oxidation of carbon monoxide (CO) in air to remove CO using the gold-silver cerium dioxide-supported catalysts are disclosed. The gold loading is between 0.5 and 5 wt. %. Gold and silver particle sizes are between 1 and 3 nm, and Au/Ag weight ratio is between 1 and 10. Oxidation of CO in air over these catalysts is carried out in a fixed bed reactor to remove CO.

1 Claim, No Drawings

US 8,987,166 B2

PREPARATION OF CERIUM OXIDE-SUPPORTED NANO GOLD-SILVER CATALYSTS AND ITS APPLICATION IN CARBON MONOXIDE REMOVAL IN AIR

CROSS REFERENCE TO RELATED APPLICATIONS

This Non-provisional application claims priority under 35 U.S.C. §119(a) on Patent Application No(s). 101101434 filed in Taiwan, Republic of China on Jan. 13, 2012, the entire contents of which are hereby incorporated by reference.

BACKGROUND OF THE INVENTION

1. Field of Invention

The present invention discloses a preparation method of nano-gold-silver cerium dioxide-supported catalysts and a process of oxidation of carbon monoxide (CO) in air to remove CO using the nano-gold-silver cerium dioxide-supported catalysts. The gold loading is between 0.5 and 5 wt. %. Gold and silver particle sizes are between 1 and 3 nm, and Au/Ag weight ratio is between 1 and 10. Oxidation of CO in air over these catalysts is carried out in a fixed bed reactor to remove CO.

2. Related Art

Some disclosures related to gold catalyst is applied to oxidation of CO and never taught to use bimetallic gold-silver cerium dioxide-supported catalysts and to induce the reaction under 100° C. or less. The precious metal catalysts, such as Pt or Au, is used in the oxidation of CO (J. Power Sources Vol. 135 (2004), pages 177-183; Journal of Power Sources, Vol. 165 (2007), pages 353-358; Catalysis Letter, Vol. 127 (2009), pages 339-347). However, the extremely high prices limit the application of the precious metal catalysts. In general, the gold catalysts must carry 3 wt. % gold or more to achieve the desired activity. Thus, it is desired to add some cheaper metals to increase the activity. For example, the activity of gold-$CeO_2$ catalysts can be improved by adding silver, which is cheaper than gold. The precious metal catalysts were improved by the following method (Journal of Catalysis, Vol. 281 (2011), pages 40-49). The bimetallic Ag—Co catalysts are prepared by coprecipitation method. After the calcining process at different temperatures, the bimetallic Ag—Co catalysts may have different CO oxidation activities, selectivities, and XRD results. Based on the XRD results, the calcining process at 200° C. can combine Ag and Co to form a compound $AgCoO_2$, and the catalysts have the largest surface area. Besides, since Ag and Co are combined to form a compound $AgCoO_2$, the CO oxidation activity of the calcined bimetallic Ag—Co catalysts is increased.

Some other disclosures regarding to the gold catalyst application will be described hereinafter. Taiwan Patent Publication No. 200613048 discloses a preparation of nano-gold ceria-supported catalysts and its application in CO removal in gas. U.S. Pat. No. 5,258,340 discloses a mixed transition metal oxide catalysts for conversion of carbon monoxide and method for producing the catalysts. The published references never disclose the feature of the present invention that uses nano-gold-silver catalysts supported on $CeO_2$ to preferential oxidize CO.

SUMMARY OF THE INVENTION

The present invention discloses a preparation method of nano-gold-silver cerium dioxide-supported catalysts and a process of oxidation of carbon monoxide (CO) in air to remove CO using the nano-gold-silver cerium dioxide-supported catalysts. The gold loading is between 0.5 and 5 wt. %. Gold and silver particle sizes are between 1 and 3 nm, and Au/Ag weight ratio is between 1 and 10. Oxidation of CO in air over the gold-silver cerium dioxide-supported catalysts is carried out in a fixed bed reactor to remove CO. The present invention is benefit in less gold required, and the addition of silver can provide high activity.

These and other features, aspects and advantages of the present invention will become better understood with regard to the following description and appended claims.

DETAILED DESCRIPTION OF THE INVENTION

First Embodiment:

Bimetallic gold-silver catalysts are prepared by a deposition-precipitation method with using cerium dioxide as the supporter, wherein gold and silver are mixed in different weight ratios.

1. Dissolving proper amount of cerium dioxide ($CeO_2$) in proper distilled water, stirring the solution, heating to any temperature between 50° C. and 80° C., and remaining at the temperature;
2. Dissolving proper amount of silver nitrate in proper distilled water, slowly adding the silver nitrate solution into the $CeO_2$ solution, and stirring for 2-8 hours;
3. Dissolving proper amount of tetrachloroauric acid in distilled water;
4. Adding ammonia water into the mixture solution of step 3 to control the pH value thereof between 7 and 9, and then slowly adding the tetrachloroauric acid solution into the mixture solution at a temperature between 50° C. and 80° C. and with the pH value between 7 and 9;
5. Stirring the mixture solution for 2 hours at a temperature between 50° C. and 80° C. and with the pH value between 7 and 9;
6. Filtering the solution to obtain the precipitate, washing the precipitate by distilled water several times until completely removing chorine, and drying the precipitate at a temperature between 50° C. and 150° C.; and
7. Calcining the dried precipitate in air at a temperature between 80° C. and 20° C. so as to obtain the desired Au—Ag/$CeO_2$ catalysts.

EXAMPLE 1

1. Preparation Au—Ag catalysts (Au:Ag=1:1). 2.97 g $CeO_2$ was dissolved in 400 ml distilled water, and the solution was stirred and heated to 65° C.;
2. 0.015 g silver nitrate was dissolved in 5 ml distilled water, and the silver nitrate solution was slowly added into the $CeO_2$ solution and stirred for 2 hours;
3. 0.8 ml tetrachloroauric acid solution (0.0125 g Au/ml) was added into 7.2 ml distilled water (dilute for 10 times);
4. 0.1M ammonia water was added into the mixture solution of step 3 to control the pH value at 8±0.2, and then the tetrachloroauric acid solution was added into the mixture solution (5-20 ml/min) at 65° C. and with the pH value of 8±0.2;
5. The mixture solution was stirred for 2 hours at 65° C. and with the pH value of 8±0.2 until the reaction was completed;
6. The solution is filtered to obtain the precipitate, and the precipitate was washed by distilled water (60° C.) several times until completely removing chorine, and dried at 80° C. for 16 hours; and 7. The dried precipitate was calcined in air at 180° C. for 4 hours so as to obtain the desired Au—Ag/CeO$_2$ catalyst powder.

EXAMPLE 2

1. Preparation Au—Ag catalysts (Au:Ag=1:1). 2.97 g CeO$_2$ was dissolved in 400 ml distilled water, and the solution was stirred and heated to 65° C.;

2. 0.015 g silver nitrate was dissolved in 5 ml distilled water, and the silver nitrate solution was slowly added into the CeO$_2$ solution and stirred for 2 hours;

3. 0.8 ml tetrachloroauric acid solution (0.0125 g Au/ml) was added into 7.2 ml distilled water (dilute for 10 times);

4. 0.1M ammonia water was added into the mixture solution of step 3 to control the pH value at 8±0.2, and then the tetrachloroauric acid solution was added into the mixture solution (5-20 ml/min) at 65° C. and with the pH value of 8±0.2;

5. The mixture solution was stirred for 2 hours at 65° C. and with the pH value of 8±0.2 until the reaction was completed;

6. The solution is filtered to obtain the precipitate, the precipitate was washed by distilled water (60° C.) several times until completely removing chorine, and dried at 80° C. for 16 hours; and the dried precipitate was calcined in air at 350° C. for 4 hours so as to obtain the desired Au—Ag/CeO$_2$ catalyst powder.

Second Embodiment:

1. The Au—Ag/CeO$_2$ catalysts were mounted in a fixed bed reactor, and the oxidation of CO in air was carried out by the fixed bed reactor, wherein the concentration of CO is between 5 vol. % and 100 ppm; and 2. The flow rate of the gas entering the reactor was controlled between 10 and 10,000 h$^{-1}$ at a temperature between 25 and 200° C., thereby completely oxidating contained CO.

EXAMPLE 3

1. 0.1 g Au—Ag(1:1)/CeO$_2$ catalysts were mounted in a vertical fixed bed reactor, and the oxidation of CO in air was carried out by the fixed bed reactor;

2. The flow rate of the gas entering the reactor was controlled between at 50 ml/min at different temperatures; and 3. The concentrations of CO were detected by GC (Gas Chromatography).

| Temperature (° C.) | 30 | 100 | 120 | 140 | 200 |
|---|---|---|---|---|---|
| CO conversion (%) | 100 | 100 | 100 | 100 | 100 |

EXAMPLE 3

1. 0.1 g Au—Ag(1:1)/CeO$_2$ catalysts were mounted in a vertical fixed bed reactor, and the oxidation of CO in air was carried out by the fixed bed reactor;

2. The flow rate of the gas entering the reactor was controlled between at 50 ml/min at different temperatures; and 3. The concentrations of CO were detected by GC (Gas Chromatography).

| Temperature (° C.) | 30 | 100 | 120 | 140 | 200 |
|---|---|---|---|---|---|
| CO conversion (%) | 100 | 100 | 100 | 100 | 100 |

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A preparation method of nano-gold-silver cerium dioxide-supported catalysts, comprising the steps of:
preparing gold-silver cerium dioxide-supported catalysts by a deposition-precipitation method, wherein gold/silver weight ratio is between 1 and 10, the gold loading is between 0.5 and 5 wt. %, and the preparation method is characterized in:
mixing a silver nitrate solution and cerium dioxide (CeO$_2$) by a deposition-precipitation method; stirring the mixture solution at a temperature between 50° C. and 80° C. for 2-8 hours; dropping a HAuCl$_4$ solution in the mixture solution by a deposition-precipitation method; adding ammonia water into the mixture solution to control the pH value thereof between 5 and 9; stirring the mixture solution at a temperature between 50° C. and 80° C. for 1-10 hours; washing by distilled water at a temperature between 50° C. and 80° C.; drying at a temperature between 50° C. and 150° C. for 8-24 hours; and calcining between 120° C. and 240° C. for 2-8 hours; wherein the diameter of the supported gold and silver particles is between 1 and 3 nanometers.

* * * * *